US012625818B2

(12) United States Patent
Jung

(10) Patent No.: US 12,625,818 B2
(45) Date of Patent: May 12, 2026

(54) STORAGE DEVICE CONTROLLING READY-TO-TRANSFER REQUEST FOR WRITE COMMAND AND OPERATING METHOD THEREOF

(71) Applicant: SK hynix Inc., Gyeonggi-do (KR)

(72) Inventor: Hoe Seung Jung, Gyeonggi-do (KR)

(73) Assignee: SK hynix Inc., Gyeonggi-do (KR)

( * ) Notice: Subject to any disclaimer, the term of this patent is extended or adjusted under 35 U.S.C. 154(b) by 0 days.

(21) Appl. No.: 18/798,813

(22) Filed: Aug. 9, 2024

(65) Prior Publication Data

US 2025/0335360 A1     Oct. 30, 2025

(30) Foreign Application Priority Data

Apr. 26, 2024     (KR) ........................ 10-2024-0056051

(51) Int. Cl.
*G06F 3/06* (2006.01)
*G06F 12/0871* (2016.01)
(52) U.S. Cl.
CPC ........ *G06F 12/0871* (2013.01); *G06F 3/0613* (2013.01); *G06F 3/0656* (2013.01); *G06F 3/0659* (2013.01); *G06F 3/0673* (2013.01)

(58) Field of Classification Search
CPC .. G06F 12/0871; G06F 3/0613; G06F 3/0656; G06F 3/0659; G06F 3/0673
See application file for complete search history.

(56) References Cited

U.S. PATENT DOCUMENTS

2022/0300205 A1* 9/2022 Lee ........................ G06F 3/0659

FOREIGN PATENT DOCUMENTS

KR     10-2020-0124937 A     11/2020
KR     10-2023-0018831 A     2/2023

* cited by examiner

*Primary Examiner* — Janice M. Girouard
(74) *Attorney, Agent, or Firm* — IP & T GROUP LLP

(57) ABSTRACT

A storage device receives a write command requesting to write write data from a host, determines a first time point at which a memory starts performing a target operation different from an operation of storing the write data, and, after determining the first time point, suspends transmission of a ready-to-transfer request for the write command from a second time point as a time point earlier than the first time point.

17 Claims, 9 Drawing Sheets

STORAGE DEVICE CONTROLLING READY-TO-TRANSFER REQUEST FOR WRITE COMMAND AND OPERATING METHOD THEREOF

CROSS-REFERENCE TO RELATED APPLICATION

The present application claims priority under 35 U.S.C. § 119(a) to Korean Patent Application No. 10-2024-0056051 filed on Apr. 26, 2024, which is incorporated herein by reference in its entirety.

BACKGROUND

1. Technical Field

Embodiments of the present disclosure generally relate to a storage device which controls a ready-to-transfer request for a write command and an operating method thereof.

2. Related Art

A storage device is a device for storing data according to a request from an external device such as a computer, a mobile terminal (e.g., a smart phone or tablet), or the like.

A storage device may include a memory for storing data therein and a controller for controlling the memory. The memory may be a volatile memory or a non-volatile memory. The controller may receive a command from an external device (i.e., a host), and execute or control operations to write data in the memory included in the storage device, read data from the memory, or erase data stored in the memory, according to the received command.

The controller may execute a preset target operation at a specific time point. The controller needs to secure a free space of at least a predetermined size to execute the target operation.

If the size of the free space currently available for the controller to use is insufficient, the controller may secure a free space by deleting data necessary to perform another operation. Due to this fact, performance degradation may be caused in a process in which the controller performs the other operation.

SUMMARY

Various embodiments of the present disclosure are directed to providing a storage device and an operating method thereof capable of minimizing performance degradation caused in the process of securing a free space for executing a target operation.

In an embodiment of the present disclosure, a storage device may include a memory configured to store write data received from a host; and a controller configured to control the memory to store the write data, wherein the controller receives a write command requesting to write the write data from the host, determines a first time point at which the memory starts performing a target operation different from an operation of storing the write data, and, after determining the first time point, suspends transmission of a ready-to-transfer request for the write command from a second time point as a time point earlier than the first time point.

In another embodiment of the present disclosure, a method for operating a storage device may include receiving a write command requesting to write write data from a host; determining a first time point at which performing a target operation different from an operation of storing the write data is started; and suspending, after determining the first time point, transmission of a ready-to-transfer request for the write command from a second time point as a time point earlier than the first time point.

In another embodiment of the present disclosure, a system may include a host configured to transmit write data and a write command requesting to store the write data; and a storage device including a memory, a buffer memory, and a controller configured to receive, from the host, the write data and the write command, store the write data in the buffer memory, control the memory to perform a program operation for storing, in the memory, the write data stored in the buffer memory, and transmit, to the host, a ready-to-transfer request in response to the write command. The controller may suspend transmission of the ready-to-transfer request before a target operation using the buffer memory is performed, and resume the transmitting of the ready-to-transfer request after performing the target operation is completed, and the target operation is different from the program operation.

According to the embodiments of the present disclosure, it is possible to minimize performance degradation caused in the process of securing a free space for executing a target operation.

DETAILED DESCRIPTION

Figure 1:
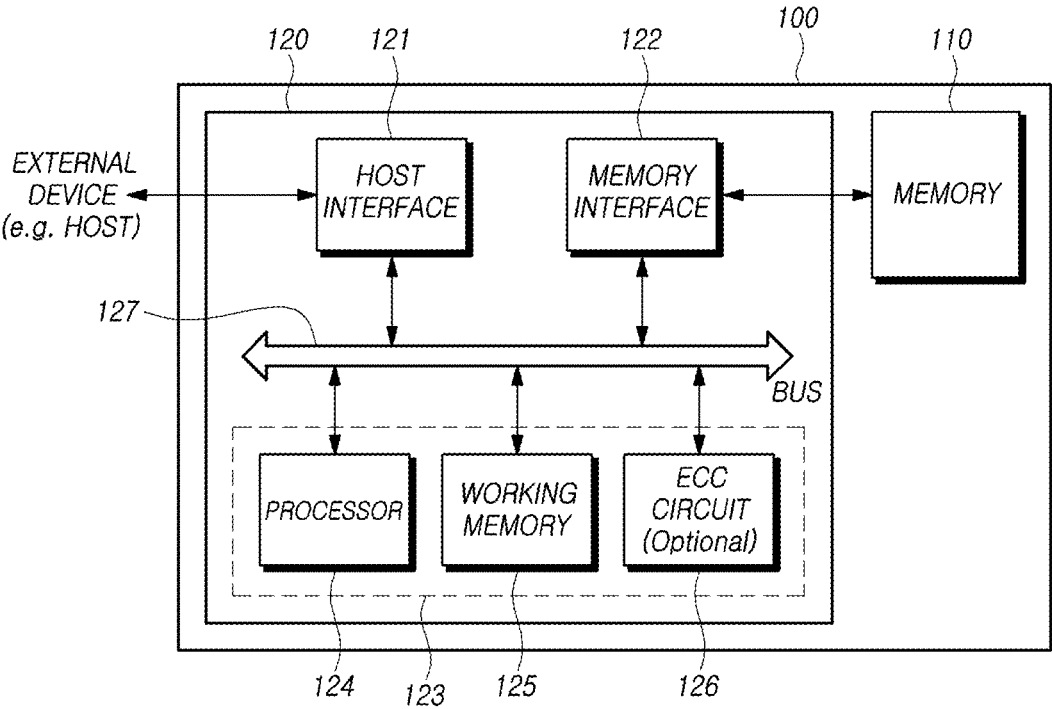
FIG. 1 is a schematic configuration diagram of a storage device according to an embodiment of the present disclosure.

Hereinafter, embodiments of the present disclosure are described in detail with reference to the accompanying drawings. Throughout the specification, reference to "an embodiment," "another embodiment" or the like is not necessarily to only one embodiment, and different references to any such phrase are not necessarily limited to the same embodiment(s). The term "embodiments" when used herein does not necessarily refer to all embodiments.

Various embodiments of the present disclosure are described below in more detail with reference to the accompanying drawings. However, the embodiment of the present disclosure may be embodied in different forms and variations, and should not be construed as being limited to the embodiments set forth herein. Rather, the described embodiments are provided so that this disclosure will be thorough and complete and will fully convey the scope of the present disclosure to those skilled in the art to which this disclosure pertains. Throughout this disclosure, like reference numerals refer to like parts throughout the various figures and embodiments of the present disclosure.

The methods, processes, and/or operations described herein may be performed by code or instructions to be executed by a computer, processor, controller, or other signal processing device. The computer, processor, controller, or other signal processing device may be those described herein or one in addition to the elements described herein. Because the algorithms that form the basis of the methods (or operations of the computer, processor, controller, or other signal processing device) are described in detail, the code or instructions for implementing the operations of the method embodiments may transform the computer, processor, controller, or other signal processing device into a special-purpose processor for performing methods herein.

When implemented at least partially in software, the controllers, processors, devices, modules, units, multiplexers, logic, interfaces, decoders, drivers, generators and other signal generating and signal processing features may include, for example, a memory or other storage device for storing code or instructions to be executed, for example, by a computer, processor, microprocessor, controller, or other signal processing device.

FIG. 1 is a schematic configuration diagram of a storage device 100 according to an embodiment of the disclosure.

Referring to FIG. 1, the storage device 100 may include a memory 110 that stores data and a controller 120 that controls the memory 110.

The memory 110 includes a plurality of memory blocks and operates in response to the control of the controller 120. Operations of the memory 110 may include, for example, a read operation, a program operation (also referred to as a write operation) and an erase operation.

The memory 110 may include a memory cell array including a plurality of memory cells (also simply referred to as "cells") that store data.

For example, the memory 110 may be realized in various types of memory such as a DDR SDRAM (double data rate synchronous dynamic random access memory), an LPDDR4 (low power double data rate 4) SDRAM, a GDDR (graphics double data rate) SDRAM, an LPDDR (low power DDR), an RDRAM (Rambus dynamic random access memory), a NAND flash memory, a 3D NAND flash memory, a NOR flash memory, a resistive random access memory (RRAM), a phase-change memory (PRAM), a magnetoresistive random access memory (MRAM), a ferroelectric random access memory (FRAM) and a spin transfer torque random access memory (STT-RAM).

The memory 110 may be implemented as a three-dimensional array structure. For example, embodiments of the present disclosure may be applied to a charge trap flash (CTF) in which a charge storage layer is configured by a dielectric layer and a flash memory in which a charge storage layer is configured by a conductive floating gate.

The memory 110 may receive a command and an address from the controller 120 and may access an area in the memory cell array that is selected by the address. The memory 110 may perform an operation indicated by the command, on the area selected by the address.

The memory 110 may perform a program operation, a read operation or an erase operation. For example, when performing the program operation, the memory 110 may program data to the area selected by the address. When performing the read operation, the memory 110 may read data from the area selected by the address. In the erase operation, the memory 110 may erase data stored in the area selected by the address.

The controller 120 may control write (program), read, erase and background operations for the memory 110. For example, background operations may include at least one of a garbage collection (GC) operation, a wear leveling (WL) operation, a read reclaim (RR) operation, a bad block management (BBM) operation, and so forth.

The controller 120 may control the operation of the memory 110 according to a request from an external device (e.g., a host) located outside the storage device 100. The controller 120, however, also may control the operation of the memory 110 regardless of a request of the external device.

The host may be a computer, an ultra mobile PC (UMPC), a workstation, a personal digital assistant (PDA), a tablet, a mobile phone, a smartphone, an e-book, a portable multimedia player (PMP), a portable game player, a navigation device, a black box, a digital camera, a digital multimedia broadcasting (DMB) player, a smart television, a digital audio recorder, a digital audio player, a digital picture recorder, a digital picture player, a digital video recorder, a digital video player, a storage configuring a data center, one of various electronic devices configuring a home network, one of various electronic devices configuring a computer network, one of various electronic devices configuring a telematics network, an RFID (radio frequency identification) device, and a mobility device (e.g., a vehicle, a robot or a drone) capable of driving under human control or autonomous driving, as non-limiting examples. Alternatively, the host may be a virtual reality (VR) device providing 2D or 3D virtual reality images or an augmented reality (AR) device providing augmented reality images. The host may be any one of various electronic devices that require the storage device 100 capable of storing data.

The host may include at least one operating system (OS). The operating system may generally manage and control the function and operation of the host and may control interoperability between the host and the storage device 100. The operating system may be classified into a general operating system and a mobile operating system depending on the mobility of the host.

The controller 120 and the host may be devices that are separated from each other, or the controller 120 and the host may be integrated into one device. Hereunder, for the sake of convenience, descriptions will describe the controller 120 and the host as devices that are separated from each other.

Referring to FIG. 1, the controller 120 may include a memory interface 122 and a control circuit 123, and may further include a host interface 121.

The host interface 121 provides an interface for communication with the host. For example, the host interface 121 provides an interface that uses at least one of various communication standards or interfaces such as a USB (universal serial bus) protocol, an MMC (multimedia card) protocol, a PCI (peripheral component interconnection) protocol, a PCI-e or PCIe (PCI-express) protocol, an ATA (advanced technology attachment) protocol, a serial-ATA protocol, a parallel-ATA protocol, an SCSI (small computer system interface) protocol, an ESDI (enhanced small disk interface) protocol, an IDE (integrated drive electronics) protocol and a private protocol.

When receiving a command from the host, the control circuit 123 may receive the command through the host interface 121, and may perform an operation of processing the received command.

The memory interface 122 may be coupled with the memory 110 to provide an interface for communication with the memory 110. That is, the memory interface 122 may be configured to provide an interface between the memory 110 and the controller 120 in response to the control of the control circuit 123.

The control circuit 123 performs the general control operations of the controller 120 to control the operation of the memory 110. To this end, for instance, the control circuit 123 may include at least one of a processor 124 and a working memory 125, and may optionally include an error detection and correction circuit (ECC circuit) 126.

The processor 124 may control general operations of the controller 120, and may perform a logic operation. The processor 124 may communicate with the host through the host interface 121, and may communicate with the memory 110 through the memory interface 122.

The processor 124 may execute logical operations required to perform the function of a flash translation layer (FTL). The processor 124 may translate a logical block address (LBA), provided by the host, into a physical block address (PBA) through the flash translation layer. The flash translation layer may receive the logical block address and translate the logical block address into the physical block address, by using a mapping table.

There are various address mapping methods of the flash translation layer, depending on a mapping unit. Representative address mapping methods include a page mapping method, a block mapping method and a hybrid mapping method.

The processor 124 may randomize data received from the host. For example, the processor 124 may randomize data received from the host by using a set randomizing seed. The randomized data may be provided to the memory 110, and may be programmed to a memory cell array of the memory 110.

In a read operation, the processor 124 may derandomize data received from the memory 110. For example, the processor 124 may derandomize data received from the memory 110 by using a derandomizing seed. The derandomized data may be outputted to the host.

The processor 124 may execute firmware to control the operation of the controller 120. Namely, to control the general operation of the controller 120 and perform a logic operation, the processor 124 may execute (drive) firmware loaded in the working memory 125 upon booting. Hereafter, an operation of the storage device 100 according to embodiments of the present disclosure will be described as implementing a processor 124 that executes firmware in which the corresponding operation is defined.

Firmware is a program to be executed in the storage device 100 to drive the storage device 100, and may include various functional layers. For example, the firmware may include binary data in which codes for executing the functional layers, respectively, are defined.

For example, the firmware may include at least one of a flash translation layer, a host interface layer (HIL), and a flash interface layer (FIL), The flash translation layer performs a translating function between a logical address requested to the storage device 100 from the host and a physical address of the memory 110. The host interface layer (HIL) serves to analyze a command requested to the storage device 100 as a storage device from the host and transfer the command to the flash translation layer. The flash interface layer (FIL) transfers a command, instructed from the flash translation layer, to the memory 110.

Such firmware may be loaded in the working memory 125 from, for example, the memory 110 or a separate nonvolatile memory (e.g., a ROM or a NOR Flash) located outside the memory 110. The processor 124 may first load all or a part of the firmware in the working memory 125 when executing a booting operation after power-on.

The processor 124 may perform a logic operation, which is defined in the firmware loaded in the working memory 125, to control the general operation of the controller 120. The processor 124 may store a result of performing the logic operation defined in the firmware, in the working memory 125. The processor 124 may control the controller 120 according to a result of performing the logic operation defined in the firmware such that the controller 120 generates a command or a signal. When a part of firmware, in which a logic operation to be performed is defined, is stored in the memory 110, but not loaded in the working memory 125, the processor 124 may generate an event (e.g., an interrupt) for loading the corresponding part of the firmware into the working memory 125 from the memory 110.

The processor 124 may load metadata necessary for driving firmware from the memory 110. The metadata is data for managing the memory 110, and may include for example, management information on user data stored in the memory 110.

Firmware may be updated while the storage device 100 is manufactured or while the storage device 100 is operating. The controller 120 may download new firmware from the outside of the storage device 100 and update existing firmware with the new firmware.

To drive the controller 120, the working memory 125 may store necessary firmware, a program code, a command and data. The working memory 125 may be a volatile memory that includes, for example, at least one of an SRAM (static RAM), a DRAM (dynamic RAM) and an SDRAM (synchronous DRAM). The controller 120 may additionally use a separate volatile memory (e.g., SRAM, DRAM) located outside the controller 120 in addition to the working memory 125.

The error detection and correction circuit 126 may detect an error bit of target data, and correct the detected error bit by using an error correction code. The target data may be, for example, data stored in the working memory 125 or data read from the memory 110.

The error detection and correction circuit 126 may decode data by using an error correction code. The error detection and correction circuit 126 may be realized by various code decoders. For example, a decoder that performs unsystematic code decoding or a decoder that performs systematic code decoding may be used.

For example, the error detection and correction circuit 126 may detect an error bit by the unit of a set sector in each of the read data, when each read data is constituted by a plurality of sectors. A sector may mean a data unit that is less than a page, which is the read unit of a flash memory. Sectors constituting each read data may be matched with one another using an address.

The error detection and correction circuit 126 may calculate a bit error rate (BER), and may determine whether an error is correctable or not, by sector units. For example, when a bit error rate is higher than a reference value, the error detection and correction circuit 126 may determine that a corresponding sector is uncorrectable or a fail. On the other hand, when a bit error rate is lower than the reference value, the error detection and correction circuit 126 may determine that a corresponding sector is correctable or a pass.

The error detection and correction circuit 126 may perform an error detection and correction operation sequentially for all read data. In the case where a sector included in read data is correctable, the error detection and correction circuit 126 may omit an error detection and correction operation for a corresponding sector for next read data. If the error detection and correction operation for all read data is ended in this way, then the error detection and correction circuit 126 may detect a sector which is uncorrectable in read data last. There may be one or more sectors that are determined to be uncorrectable. The error detection and correction circuit 126 may transfer, to the processor 124, information (e.g., address information) regarding a sector which is determined to be uncorrectable.

A bus 127 may be configured to provide channels among the components 121, 122, 124, 125 and 126 of the controller 120. The bus 127 may include, for example, a control bus for transferring various control signals, commands and the like, a data bus for transferring various data, and so forth.

Some components among the above-described components 121, 122, 124, 125 and 126 of the controller 120 may be omitted, or some components among the above-described components 121, 122, 124, 125 and 126 of the controller 120 may be integrated into one component. In addition to the above-described components 121, 122, 124, 125 and 126 of the controller 120, one or more other components may be added.

Hereinbelow, the memory 110 will be described in further detail with reference to FIG. 2.

Figure 2:
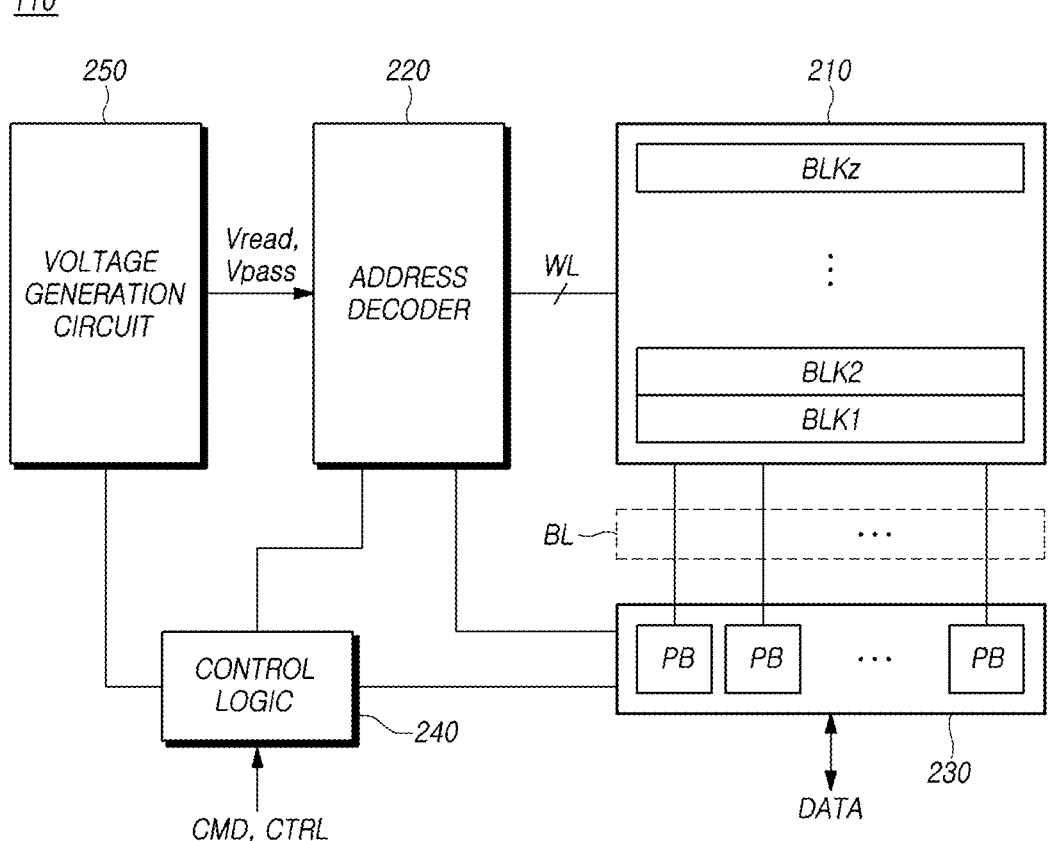
FIG. 2 is a block diagram schematically illustrating a memory of FIG. 1.

FIG. 2 is a block diagram schematically illustrating a memory 110 of FIG. 1.

Referring to FIG. 2, the memory 110 according to an embodiment of the present disclosure may include a memory cell array 210, an address decoder 220, a read and write circuit 230, a control logic 240, and a voltage generation circuit 250.

The memory cell array 210 may include a plurality of memory blocks BLK1 to BLKz, where z is a natural number of 2 or greater.

In the plurality of memory blocks BLK1 to BLKz, a plurality of word lines WL and a plurality of bit lines BL may be disposed, and a plurality of memory cells may be arranged.

The plurality of memory blocks BLK1 to BLKz may be coupled with the address decoder 220 through the plurality of word lines WL. The plurality of memory blocks BLK1 to BLKz may be coupled with the read and write circuit 230 through the plurality of bit lines BL.

Each of the plurality of memory blocks BLK1 to BLKz may include a plurality of memory cells. For example, the plurality of memory cells may be nonvolatile memory cells, and may be configured by nonvolatile memory cells that have vertical channel structures.

The memory cell array 210 may be configured by a memory cell array of a two-dimensional structure or may be configured by a memory cell array of a three-dimensional structure.

Each of the plurality of memory cells included in the memory cell array 210 may store at least 1-bit data. For instance, each of the plurality of memory cells included in the memory cell array 210 may be a single level cell (SLC)

that stores 1-bit data. In another instance, each of the plurality of memory cells included in the memory cell array 210 may be a multi-level cell (MLC) that stores 2-bit data. In still another instance, each of the plurality of memory cells included in the memory cell array 210 may be a triple level cell (TLC) that stores 3-bit data. In yet another instance, each of the plurality of memory cells included in the memory cell array 210 may be a quad level cell (QLC) that stores 4-bit data. In a further instance, the memory cell array 210 may include a plurality of memory cells, each of which stores 5 or more-bit data.

The number of bits of data stored in each of the plurality of memory cells may be dynamically determined. For example, a single-level cell that stores 1-bit data may be changed to a triple-level cell that stores 3-bit data.

Referring to FIG. 2, the address decoder 220, the read and write circuit 230, the control logic 240 and the voltage generation circuit 250 may operate as a peripheral circuit that drives the memory cell array 210.

The address decoder 220 may be coupled to the memory cell array 210 through the plurality of word lines WL.

The address decoder 220 may be configured to operate in response to the control of the control logic 240.

The address decoder 220 may receive an address through an input/output buffer in the memory 110. The address decoder 220 may be configured to decode a block address in the received address. The address decoder 220 may select at least one memory block depending on the decoded block address.

The address decoder 220 may receive a read voltage Vread and a pass voltage Vpass from the voltage generation circuit 250.

During a read operation, the address decoder 220 may apply the read voltage Vread to a selected word line WL in a selected memory block, and may apply the pass voltage Vpass to the remaining unselected word lines WL.

In a program verify operation, the address decoder 220 may apply a verify voltage generated by the voltage generation circuit 250 to a selected word line WL in a selected memory block, and may apply the pass voltage Vpass to the remaining unselected word lines WL.

The address decoder 220 may be configured to decode a column address in the received address. The address decoder 220 may transmit the decoded column address to the read and write circuit 230.

A read operation and a program operation of the memory 110 may be performed by the unit of a page. An address received when a read operation or a program operation is requested may include at least one of a block address, a row address and a column address.

The address decoder 220 may select one memory block and one word line depending on a block address and a row address. A column address may be decoded by the address decoder 220 and be provided to the read and write circuit 230.

The address decoder 220 may include at least one of a block decoder, a row decoder, a column decoder and an address buffer.

The read and write circuit 230 may include a plurality of page buffers PB. The read and write circuit 230 may operate as a read circuit in a read operation of the memory cell array 210, and may operate as a write circuit in a write operation of the memory cell array 210.

The read and write circuit 230 described above may also be referred to as a page buffer circuit or a data register circuit that includes a plurality of page buffers PB. The read and write circuit 230 may include data buffers that take charge of a data processing function, and may further include cache buffers that take charge of a caching function.

The plurality of page buffers PB may be coupled to the memory cell array 210 through the plurality of bit lines BL. The plurality of page buffers PB may continuously supply sensing current to bit lines BL coupled with memory cells to sense threshold voltages (Vth) of the memory cells in a read operation and a program verify operation, and may latch sensing data by sensing, through sensing nodes, changes in the amounts of current flowing, depending on the programmed states of the corresponding memory cells.

The read and write circuit 230 may operate in response to page buffer control signals outputted from the control logic 240.

In a read operation, the read and write circuit 230 temporarily stores read data by sensing data of memory cells, and then, outputs data DATA to the input/output buffer of the memory 110. In an embodiment, the read and write circuit 230 may include a column select circuit in addition to the page buffers PB or the page registers.

The control logic 240 may be coupled with the address decoder 220, the read and write circuit 230 and the voltage generation circuit 250. The control logic 240 may receive a command CMD and a control signal CTRL through the input/output buffer of the memory 110.

The control logic 240 may be configured to control general operations of the memory 110 in response to the control signal CTRL. The control logic 240 may output control signals for adjusting the precharge potential levels of the sensing nodes of the plurality of page buffers PB.

The control logic 240 may control the read and write circuit 230 to perform a read operation of the memory cell array 210. The voltage generation circuit 250 may generate the read voltage Vread and the pass voltage Vpass used in a read operation, in response to a voltage generation circuit control signal outputted from the control logic 240.

Each memory block of the memory 110 described above may be configured by a plurality of pages corresponding to a plurality of word lines WL and a plurality of strings corresponding to a plurality of bit lines BL.

In a memory block BLK, a plurality of word lines WL and a plurality of bit lines BL may be disposed to intersect with each other. For example, each of the plurality of word lines WL may be disposed in a row direction, and each of the plurality of bit lines BL may be disposed in a column direction. In another example, each of the plurality of word lines WL may be disposed in a column direction, and each of the plurality of bit lines BL may be disposed in a row direction.

A memory cell may be coupled to one of the plurality of word lines WL and one of the plurality of bit lines BL. A transistor may be disposed in each memory cell.

For example, a transistor disposed in each memory cell may include a drain, a source, and a gate. The drain (or source) of the transistor may be coupled with a corresponding bit line BL directly or via another transistor. The source (or drain) of the transistor may be coupled with a source line (which may be the ground) directly or via another transistor. The gate of the transistor may include a floating gate, which is surrounded by a dielectric, and a control gate to which a gate voltage is applied from a word line WL.

In each memory block, a first select line (also referred to as a source select line or a drain select line) may be additionally disposed outside a first outermost word line more adjacent to the read and write circuit 230 between two outermost word lines, and a second select line (also referred to as a drain select line or a source select line) may be additionally disposed outside a second outermost word line between the two outermost word lines.

At least one dummy word line may be additionally disposed between the first outermost word line and the first select line. At least one dummy word line may also be additionally disposed between the second outermost word line and the second select line.

A read operation and a program operation (write operation) of the memory block described above may be performed by the unit of a page, and an erase operation may be performed by the unit of a memory block.

Figure 3:
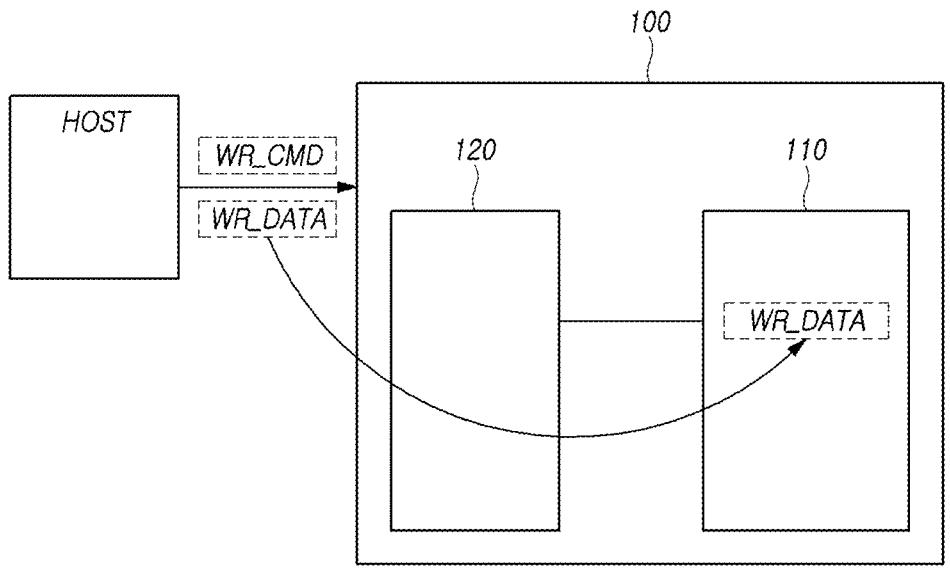
FIG. 3 is a diagram illustrating the schematic structure of a storage device according to an embodiment of the present disclosure.

FIG. 3 is a diagram illustrating the schematic structure of a storage device 100 according to an embodiment of the present disclosure.

Referring to FIG. 3, the storage device 100 may include a memory 110 and a controller 120.

The memory 110 may store write data WR_DATA received from a host HOST.

The controller 120 may control the memory 110 to store the write data WR_DATA. The controller 120 may receive, from the host HOST, a write command WR_CMD requesting to write the write data WR_DATA. In response to the write command WR_CMD, the controller 120 may write the write data WR_DATA to the memory 110.

The controller 120 may first receive the write command WR_CMD from the host HOST, and may obtain, from the write command WR_CMD, information on the write data WR_DATA (e.g., a logical address area corresponding to the write data WR_DATA and the size of the write data WR_DATA). Thereafter, the controller 120 may receive the write data WR_DATA from the host HOST.

Hereinafter, a detailed sequence of the above-described operations of the controller 120 will be described with reference to FIG. 4.

Figure 4:
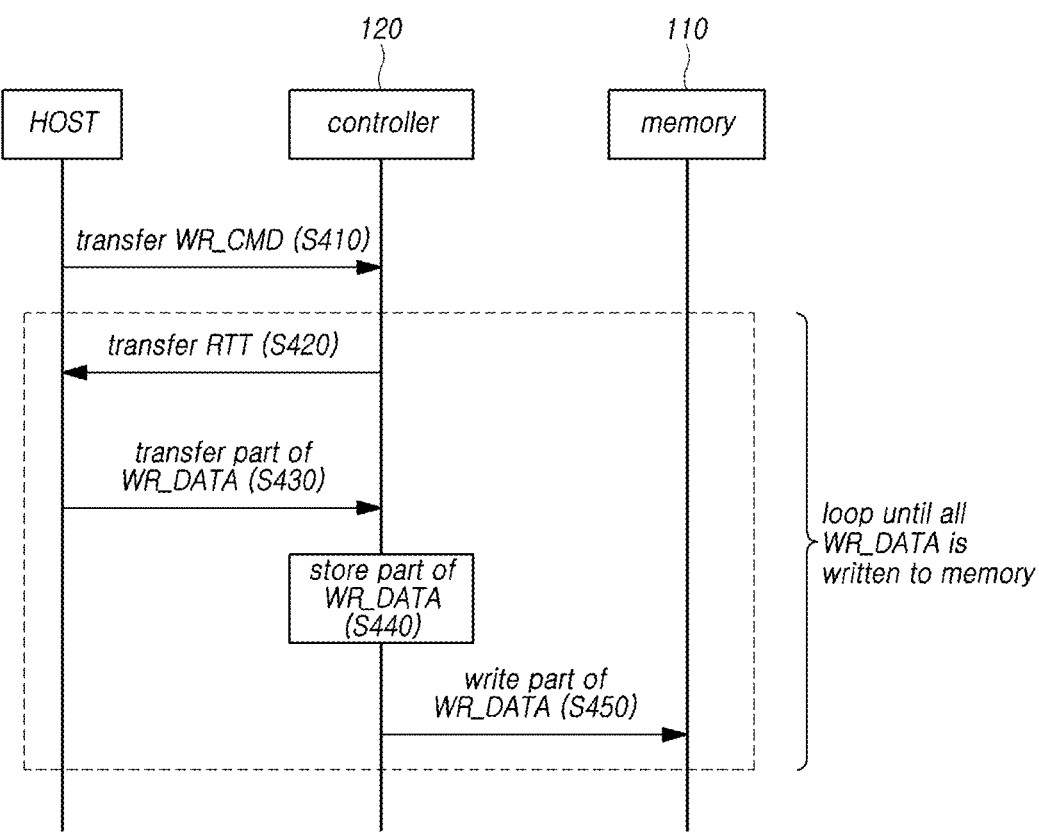
FIG. 4 is a diagram illustrating a basic operation in which the storage device according to the embodiment of the present disclosure writes write data.

FIG. 4 is a diagram illustrating an example of an operation in which the storage device 100 according to the embodiment of the present disclosure writes the write data WR_DATA.

Referring to FIG. 4, the host HOST may first transmit the write command WR_CMD to the controller 120 of the storage device 100 (S410). For example, when the storage device 100 and the host HOST operate according to a universal flash storage (UFS) specification, the host HOST may transmit, to the controller 120, a UFS protocol information unit (UPIU) for the write command WR_CMD.

The write command WR_CMD may include information on the logical address area and size of the write data WR_DATA.

After receiving the write command WR_CMD, the controller 120 may transmit, to the host HOST, a ready-to-transfer request RTT for the write command WR_CMD (S420).

The ready-to-transfer request RTT may indicate the size of data which may be received from the host HOST. After receiving the ready-to-transfer request RTT from the controller 120, the host HOST may transmit, to the controller 120, a part of the write data WR_DATA according to the size indicated by the ready-to-transfer request RTT.

For example, if the host HOST transmits to the controller 120 the write command WR_CMD requesting to write the write data WR_DATA of 1 MB size and the controller 120 transmits to the host HOST, in response to the write command WR_CMD, the ready-to-transfer request RTT indicating that the size of data to be receivable is 128 KB, the host HOST may first transmit, to the controller 120, only a part of the write data WR_DATA corresponding to 128 KB.

If the controller 120 suspends the operation of transmitting the ready-to-transfer request RTT to the host HOST, the host HOST does not transmit a part of the write data WR_DATA to the controller 120. That is, the host HOST waits without transmitting the write data WR_DATA to the controller 120 before receiving the ready-to-transfer request RTT from the controller 120.

The size of a part of the write data WR_DATA which the controller 120 may receive from the host HOST may vary depending on the size of the write data WR_DATA which may be stored by the controller 120.

For example, if the size of the write data WR_DATA which may be stored by the controller 120 is 128 KB, the controller 120 may transmit to the host HOST the ready-to-transfer request RTT indicating that the size of receivable data is 128 KB.

After receiving the ready-to-transfer request RTT, the host HOST may transmit a part of the write data WR_DATA to the controller 120 (S430). As described above, the host HOST may transmit to the controller 120 a part of the write data WR_DATA which has the size indicated by the ready-to-transfer request RTT.

The controller 120 may store the part of the write data WR_DATA received from the host HOST (S440).

For example, the controller 120 may include a buffer memory therein, and may store, in the buffer memory, the part of the write data WR_DATA received from the host HOST.

The buffer memory may be set in a variety of ways. For example, the buffer memory may be the working memory 125 inside the controller 120. For another example, the buffer memory may be a separate volatile memory or nonvolatile memory inside the controller 120, which is separated from the working memory 125.

Thereafter, the controller 120 may write, to the memory 110, the part of the write data WR_DATA stored in the buffer memory (S450). The controller 120 may write, to the memory 110, the part of the write data WR_DATA independently or together with other data.

The operations S420 to S450 may be executed repeatedly. The controller 120 may repeat the operations S420 to S450 until the entire write data WR_DATA is written to the memory 110. In this case, the controller 120 may transmit one or more ready-to-transfer requests RTT to the host HOST after receiving the write command WR_CMD.

In the embodiment of the present disclosure, in order to execute a target operation at a specific time point, the controller 120 may suspend in advance the operation of transmitting the ready-to-transfer request to the host HOST at a time point earlier than the specific time point. Hereinafter, this will be described in detail with reference to FIG. 5.

Figure 5:
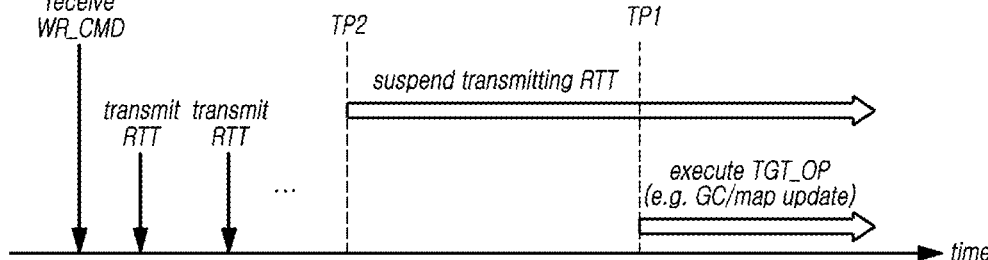
FIG. 5 is a diagram illustrating an operation in which the storage device according to the embodiment of the present disclosure suspends transmission of a ready-to-transfer request to a host.

FIG. 5 is a diagram illustrating an operation in which the storage device 100 according to the embodiment of the present disclosure suspends transmission of the ready-to-transfer request RTT to the host HOST.

Referring to FIG. 5, the controller 120 of the storage device 100 may determine a first time point TP1 to start performing a target operation TGT_OP. The target operation TGT_OP is an operation different from an operation in which the memory 110 stores the write data WR_DATA.

The target operation TGT_OP may include an operation that uses the buffer memory inside the controller 120 described with reference to FIG. 4. The controller 120 may store, in the buffer memory, data necessary to execute the target operation TGT_OP.

For example, the target operation TGT_OP may include a garbage collection operation for the memory 110, an operation of updating the address information of the write data WR_DATA stored in the memory 110, an operation of updating the firmware of the controller 120 stored in the memory 110, or an operation of recovering exclusive OR (XOR) parity of the write data WR_DATA stored in the memory 110.

After determining the first time point TP1, the controller 120 may suspend the operation of transmitting, to the host HOST, the ready-to-transfer request RTT for the write command WR_CMD from a second time point TP2 as a time point earlier than the first time point TP1. Namely, the controller 120 may suspend in advance the operation of transmitting the ready-to-transfer request RTT to the host HOST before starting the target operation TGT_OP.

In order to secure a free space of the buffer memory necessary for the target operation TGT_OP, the controller 120 may suspend in advance the operation of transmitting the ready-to-transfer request RTT to the host HOST.

In a case where the controller 120 executes the target operation TGT_OP in a state in which the write data WR_DATA received from the host HOST is stored in the buffer memory, the controller 120 should delete other data (e.g., map cache information) stored in the buffer memory to secure a free space of the buffer memory.

If the other data stored in the buffer memory is deleted, performance degradation in the controller 120 may be caused. For example, when map cache information is deleted, a map miss state in which mapping information corresponding to data to be read does not exist in the buffer memory may frequently occur in a process in which the controller 120 reads data from the memory 110. Due to this fact, performance degradation may occur in a process in which the controller 120 reads mapping information from the memory 110 again.

Therefore, by suspending in advance the operation of transmitting the read-to-transfer request RTT to the host HOST, the controller 120 may minimize a decrease in the free space of the buffer memory due to the presence of the write data WR_DATA, and may gradually secure the free space of the buffer memory.

Because the part of the write data WR_DATA previously stored in the buffer memory is deleted from the buffer memory after being written to the memory 110 and no new part of the write data WR_DATA is received from the host HOST, the free space of the buffer memory increases.

As a result, thereafter, at a time point when the target operation TGT_OP is started, the controller 120 may secure a free space of the buffer memory necessary for the target operation TGT_OP without deleting another data previously stored in the buffer memory.

In an embodiment of the present disclosure, the controller 120 may determine a time point when a predetermined condition is satisfied as the first time point TP1, and may determine the second time point TP2 based on the first time point TP1.

Hereinafter, a specific example in which the controller 120 determines the above-described first time point TP1 and second time point TP2 will be described with reference to FIGS. 6 and 7.

Figure 6:
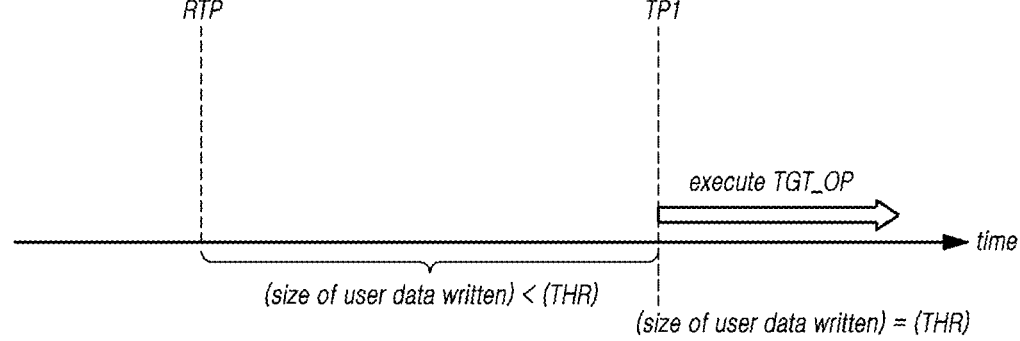
FIG. 6 is a diagram illustrating an operation in which the storage device according to the embodiment of the present disclosure determines a first time point.

FIG. 6 is a diagram illustrating an operation in which the storage device 100 according to the embodiment of the present disclosure determines the first time point TP1.

Referring to FIG. 6, the controller 120 of the storage device 100 may determine, as the first time point TP1, a time point when the size of user data stored in the memory 110 after a set reference time point RTP reaches a threshold THR.

The reference time point RTP may be determined in various ways. For example, the reference time point RTP may be a time point when the controller 120 completes a previously executed target operation TGT_OP. For another example, the reference time point RTP may be a time point that is repeated with a preset interval.

In FIG. 6, the controller 120 does not execute the target operation TGT_OP before the size of user data stored in the memory 110 after the reference time point RTP reaches the threshold THR. Thereafter, the controller 120 may execute the target operation TGT_OP when the size of user data stored in the memory 110 reaches the threshold THR.

For example, when the size of user data stored in the memory 110 after the reference time point RTP reaches 30 MB, the controller 120 may perform an operation of updating mapping information stored in the memory 110.

For another example, when the size of user data stored in the memory 110 after the reference time point RTP reaches 100 MB, the controller 120 may execute a garbage collection operation.

In this way, the controller 120 may determine the first time point TP1 based on the size of user data stored in the memory 110. Accordingly, the controller 120 may predict the first time point TP1 by tracking the size of user data stored in the memory 110, and may also determine the second time point TP2 based on the predicted first time point TP1.

Figure 7:
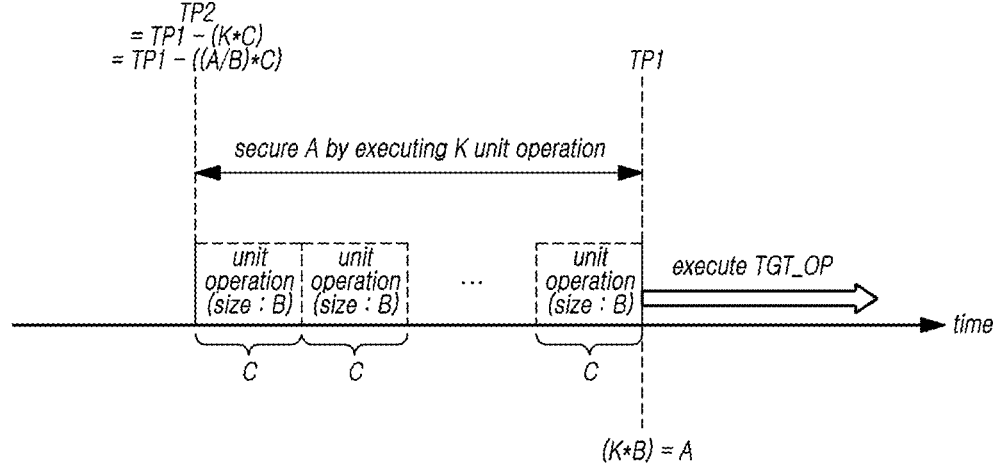
FIG. 7 is a diagram illustrating an operation in which the storage device according to the embodiment of the present disclosure determines a second time point.

FIG. 7 is a diagram illustrating an operation in which the storage device 100 according to the embodiment of the present disclosure determines the second time point TP2.

Referring to FIG. 7, the controller 120 of the storage device 100 may determine the second time point TP2 based on the first time point TP1, a first size A, a second size B and a unit time C. The first size A represents the size of a free space of the buffer memory necessary to execute the target operation TGT_OP. The second size B represents a maximum size of data which may be stored by executing a unit operation on the memory 110. The unit time C represents a time required to execute the unit operation on the memory 110.

The unit operation means an operation of storing the write data WR_DATA. When the unit operation is performed, the entirety or a part of the write data WR_DATA may be stored in the memory 110. The unit operation may be referred to as a one shot program operation.

The controller 120 may determine the second size B based on the number of dies which may be activated simultaneously in the unit operation among a plurality of memory dies (not illustrated) included in the memory 110, the number of writable memory cells in one memory die and the cell type of the writable memory cells.

For example, when the number of memory dies which may be activated simultaneously in the unit operation is 4, the number of writable memory cells in one memory die is 64K and the cell type of the writable memory cells is TLC (i.e., 3 bits per memory cell), the second size B may be determined as 4*3*64K=768 KB.

For another example, when the number of memory dies which may be activated simultaneously in the unit operation is 4, the number of writable memory cells in one memory die is 64K and the cell type of the writable memory cells is QLC (i.e., 4 bits per memory cell), the second size B may be determined as 4*4*64K=1024 KB.

In FIG. 7, the controller 120 may determine the second time point TP2 as a time point that is (A/B)*C earlier than the first time point TP1, i.e., TP2=TP1−(A/B)*C.

By repeatedly executing the unit operation, the controller 120 may secure a free space necessary to execute the target operation TGT_OP. If data equal to the second size B is written to the memory 110 by executing the unit operation once, the controller 120 may additionally secure a free space equal to the second size B.

Accordingly, to secure a free space equal to the first size A, the controller 120 should perform the unit operation K=A/B times. For example, when the first size A is 1 MB and the second size B is 192 KB, the controller 120 should perform six unit operations (=1 MB/192 KB).

Since the unit time C is required to perform one unit operation, the controller 120 may determine, as the second time point TP2, a time point that is K*C=(A/B)*C earlier than the first time point TP1.

Since the operation in which the controller 120 transmits the ready-to-transfer request RTT to the host HOST is suspended from the second time point TP2, a decrease in a free space due to the write data WR_DATA transmitted by the host HOST after the second time point TP2 does not occur.

As described above, the controller 120 may secure a free space necessary to execute the target operation TGT_OP, by repeatedly executing the unit operation.

When executing the target operation TGT_OP from the first time point TP1, the controller 120 may preliminarily allocate a part of the free space of the above-described buffer memory to store a part of the write data WR_DATA to be received from the host HOST. This prevents, when the controller 120 receives a part of the write data WR_DATA from the host HOST after the target operation TGT_OP is completed, a space for storing the part of the write data WR_DATA from becoming insufficient and thus an operation of processing a request of the host HOST from being delayed.

In the above, an operation in which the controller 120 of the storage device 100 suspends transmission of the ready-to-transfer request RTT to the host HOST has been described. Hereinafter, an operation in which the controller 120 of the storage device 100 transmits the suspended ready-to-transfer request RTT to the host HOST again will be described.

Figure 8:
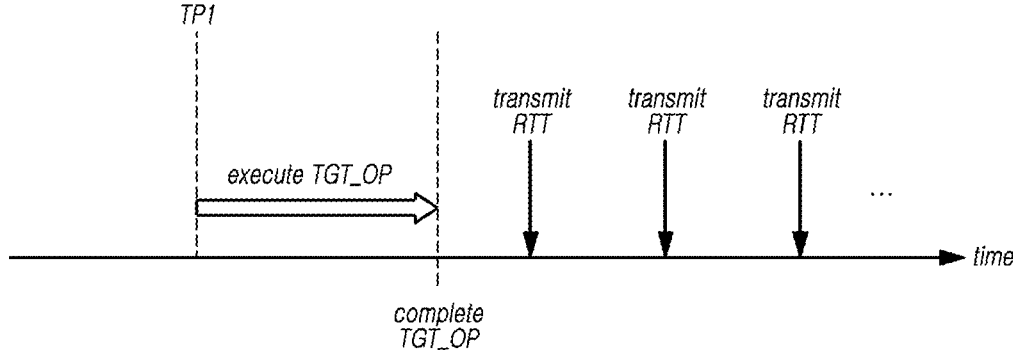
FIG. 8 is a diagram illustrating an operation in which the storage device according to the embodiment of the present disclosure resumes transmission of the ready-to-transfer request to the host.

FIG. 8 is a diagram illustrating an operation in which the storage device 100 according to the embodiment of the present disclosure resumes transmission of the ready-to-transfer request RTT to the host HOST.

Referring to FIG. 8, the controller 120 of the storage device 100 may resume transmission of the ready-to-transfer request RTT after performing the target operation TGT_OP is completed.

Accordingly, the host HOST may receive the ready-to-transfer request RTT from the controller 120. Thereafter, the host HOST may transmit a part of the write data WR_DATA to the controller 120 according to the size indicated by the received ready-to-transfer request RTT. The controller 120 may write the received write data WR_DATA to the memory 110.

Figure 9:
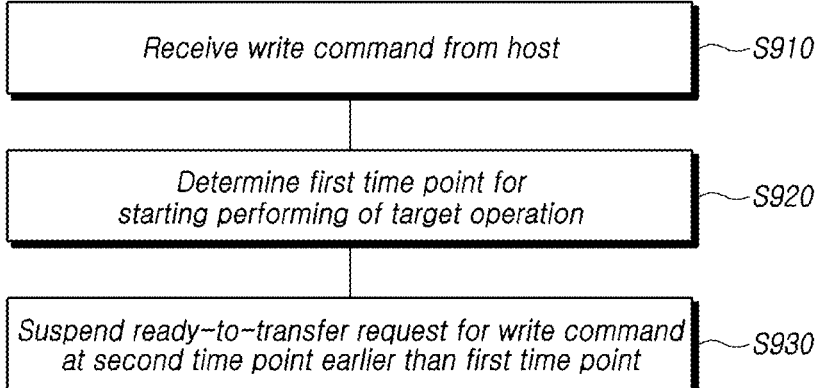
FIG. 9 is a flowchart illustrating a method for operating a storage device according to an embodiment of the present disclosure.

FIG. 9 is a diagram illustrating a method for operating the storage device 100 according to an embodiment of the present disclosure.

Referring to FIG. 9, the method for operating the storage device 100 may include S910 of receiving, from the host HOST, the write command WR_CMD requesting to write the write data WR_DATA.

The method for operating the storage device 100 may include S920 of determining the first time point TP1 to start performing the target operation TGT_OP different from an operation of storing the write data WR_DATA.

The target operation TGT_OP may include an operation that uses the buffer memory which stores the write data WR_DATA.

For example, the target operation TGT_OP may be a garbage collection operation for the memory 110, an operation of updating the address information of the write data WR_DATA stored in the memory 110, an operation of updating firmware stored in the memory 110, or an operation of recovering XOR parity of the write data WR_DATA stored in the memory 110.

In S920, the first time point TP1 may be determined based on a time point when the size of user data stored in the memory 110 after the set reference time point RTP reaches the threshold THR.

The method for operating the storage device 100 may include, after determining the first time point TP1, S930 of suspending transmission of the ready-to-transfer request RTT for the write command WR_CMD at the second time point TP2 as a time point before the first time point TP1.

For example, in S930, the second time point TP2 may be determined based on the first time point TP1, a first size as the size of a free space of the buffer memory necessary to execute the target operation TGT_OP, a second size as a maximum size of data which may be stored during a unit operation of storing write data to the memory 110, and a unit time that is required to execute the unit operation on the memory 110.

The method for operating the storage device 100 may further include resuming an operation of transmitting the ready-to-transfer request RTT after performing the target operation TGT_OP is completed.

Although embodiments of the present disclosure have been described for illustrative purposes, those skilled in the art will appreciate that various modifications, additions and substitutions are possible, without departing from the scope and spirit of the present disclosure. Therefore, the embodiments disclosed above and in the accompanying drawings should be considered in a descriptive sense only and not for limiting the technological scope. The technological scope of the present disclosure is not limited by the embodiments and the accompanying drawings. The spirit and scope of the present disclosure should be interpreted in connection with the appended claims and encompass all equivalents falling within the scope of the appended claims. Furthermore, the embodiments may be combined to form additional embodiments.

What is claimed is:

1. A storage device comprising:
a memory configured to store write data received from a host; and
a controller configured to control the memory to store the write data,
wherein the controller receives, from the host, a write command requesting to write the write data,
determines a first time point at which the memory starts performing a target operation different from an operation of storing the write data, and
after determining the first time point, suspends transmission of a ready-to-transfer request for the write command to the host, from a second time point as a time point earlier than the first time point.

2. The storage device according to claim 1, wherein the controller includes a buffer memory which stores the received write data before storing the write data to the memory.

3. The storage device according to claim 2, wherein the controller controls the memory to perform the target operation using the buffer memory.

4. The storage device according to claim 3, wherein the target operation is a garbage collection operation for the memory, an operation of updating address information of the write data stored in the memory, an operation of updating firmware of the controller stored in the memory or an operation of recovering exclusive OR (XOR) parity of the write data stored in the memory.

5. The storage device according to claim 1, wherein the controller determines, as the first time point, a time point when a size of user data stored in the memory after a set reference time point reaches a threshold.

6. The storage device according to claim 3, wherein the controller determines the second time point based on the first time point, a first size, a second size and a unit time, and
wherein the first size represents a size of a free space of the buffer memory necessary to execute the target operation, the second size represents a maximum size of data which can be stored during a unit operation of storing the write data to the memory, and the unit time represents a time required to execute the unit operation on the memory.

7. The storage device according to claim 6, wherein the controller determines the second time point as a time point (A/B)*C earlier than the first time point where A is the first size, B is the second size and C is the unit time.

8. The storage device according to claim 6, wherein the controller determines the second size based on the number of dies which are able to be activated simultaneously in the unit operation among memory dies included in the memory, the number of writable memory cells in one memory die, and a cell type of the writable memory cells.

9. The storage device according to claim 1, wherein the controller resumes transmission of the ready-to-transfer request after performing the target operation is completed.

10. A method for operating a storage device, the method comprising:
receiving, from a host, a write command requesting to store write data;
determining a first time point at which performing a target operation different from an operation of storing the write data is started; and
suspending, after determining the first time point, transmission of a ready-to-transfer request for the write command to the host, from a second time point as a time point earlier than the first time point.

11. The method according to claim 10, wherein the target operation includes an operation that uses a buffer memory which stores the write data before storing the write data to the memory.

12. The method according to claim 11, wherein the target operation is a garbage collection operation for a memory, an operation of updating address information of the write data stored in the memory, an operation of updating firmware stored in the memory or an operation of recovering exclusive OR (XOR) parity of the write data stored in the memory operation.

13. The method according to claim 10, wherein the determining the first time point determines the first time point based on a time point when a size of user data stored in the memory after a set reference time point reaches a threshold.

14. The method according to claim 11, wherein the suspending of the transmission of the ready-to-transfer request determines the second time point based on the first time point, a first size, a second size, and a unit time, and wherein the first size represents a size of a free space of the buffer memory necessary to execute the target operation, the second size represents a maximum size of data which can be stored during a unit operation of storing the write data to the memory, and the unit time represents a time required to execute the unit operation on the memory.

15. The method according to claim 14, wherein the second time point is determined as a time point (A/B)*C earlier than the first time point where A is the first size, B is the second size and C is the unit time.

16. The method according to claim 14, wherein the second size is determined based on the number of dies which are able to be activated simultaneously in the unit operation among memory dies included in the memory, the number of writable memory cells in one memory die, and a cell type of the writable memory cells.

17. The method according to claim 10, further comprising:

resuming an operation of transmitting the ready-to-transfer request after performing the target operation is completed.

* * * * *